(12) United States Patent
Stankiewicz

(10) Patent No.: US 9,477,777 B2
(45) Date of Patent: Oct. 25, 2016

(54) METHOD FOR ANALYZING AND CATEGORIZING SEMI-STRUCTURED DATA

(71) Applicant: Rakuten, Inc., New York, NY (US)

(72) Inventor: Zofia Stankiewicz, New York, NY (US)

(73) Assignee: RAKUTEN, INC., New York, NY (US)

( * ) Notice: Subject to any disclaimer, the term of this patent is extended or adjusted under 35 U.S.C. 154(b) by 342 days.

(21) Appl. No.: 13/837,764

(22) Filed: Mar. 15, 2013

(65) Prior Publication Data

US 2014/0280148 A1    Sep. 18, 2014

(51) Int. Cl.
*G06F 17/30*    (2006.01)

(52) U.S. Cl.
CPC ..... *G06F 17/30908* (2013.01); *G06F 17/3071* (2013.01)

(58) Field of Classification Search
CPC .................. G06F 17/30598; G06F 17/30705; G06F 17/30091; G06F 17/3028
USPC ................................................. 707/104, 737
See application file for complete search history.

(56) References Cited

U.S. PATENT DOCUMENTS

| | | | |
|---|---|---|---|
| 5,832,446 A * | 11/1998 | Neuhaus | G06Q 50/12 434/127 |
| 5,960,440 A | 9/1999 | Brenner et al. | |
| 6,389,436 B1 * | 5/2002 | Chakrabarti | G06F 17/3071 707/999.003 |
| 6,778,995 B1 * | 8/2004 | Gallivan | 707/739 |
| 6,970,881 B1 | 11/2005 | Mohan et al. | |
| 2002/0178394 A1 * | 11/2002 | Bamberger | G06F 11/006 714/1 |
| 2009/0009815 A1 | 1/2009 | Karasik et al. | |
| 2009/0210406 A1 * | 8/2009 | Freire | G06F 17/30864 |
| 2011/0099133 A1 * | 4/2011 | Chang | G06F 17/30707 706/12 |
| 2011/0252045 A1 * | 10/2011 | Garg et al. | 707/750 |
| 2014/0149239 A1 * | 5/2014 | Argue et al. | 705/21 |

FOREIGN PATENT DOCUMENTS

| | | | |
|---|---|---|---|
| JP | 2005284406 A | 10/2005 | |
| JP | 2008129943 A | 6/2008 | |

OTHER PUBLICATIONS

Zhu et al., "MedLDA: Maximum Margin Supervised Topic Models for Regression and Classification", 2009, Proceedings of the 26 th International Conference on Machine Learning, Montreal, Canada, pp. 1257-1264.*
Han et al., "Centroid-Based Document Classification: Analysis and Experimental Results", Jul. 18, 2010, vol. 1910 of the series Lecture Notes in Computer Science pp. 424-431.*
Mei, Qiaozhu et al., "Automatic Labelling of Multinomial Topic Models", Research Track Paper, pp. 490-499 2007.

(Continued)

*Primary Examiner* — Rehana Perveen
*Assistant Examiner* — Alexander Khong
(74) *Attorney, Agent, or Firm* — Troutman Sanders LLP

(57) ABSTRACT

A computer system interconnected to a community of users having a data processor input module programmed to receive communications from said users including one or more inputs regarding food recipes and store said inputs in accessible memory. A data processor determining module programmed to access stored data and to apply a data interpretative algorithm to said data to unify and organize disparate data inputs into a cohesive database relating to recipes. Also, a search entry module connected to the recipe database to permit access to the database to support a search algorithm applied to the database.

4 Claims, 8 Drawing Sheets

(56) References Cited

OTHER PUBLICATIONS

Lau, Jey Han et al., "Automatic Labelling of Topic Models", Proceedings of the 49th Annual Meeting of the Association for Computational Linguistics pp. 1536-1545, 2011.

Nagori, Rohit et al., "LDA Based Integrated Document Recommendation Model for e-Learning Systems", pp. 230-233, Date: Apr. 22-24, 2011.

Daud, Ali et al., "Modeling Ontology of Folksonomy with Latent Semantics of Tags", 2010 IEEE/WIC/ACM International Conference on Web Intelligence and Intelligent Agent Technology, pp. 516-523.

Lu, Linyuan et al., "Recommender Systems", arXiv:1201.1112v1 [Physics.soc-ph] Feb. 6, 2012 pp. 1-95.

International Search Report for PCT/JP2013/053779 mailed May 23, 2013.

International Search Report dated Mar. 27, 2014 to PCT/JP2013/084169.

Kunlun Li et al., "Multi-class text categorization based on LDA and SVM", Procedia Engineering, vol. 15, Dec. 31, 2011, pp. 1963-1967.

Serafettin Tasci et al., "LDA-based keyword selection in text categorization", Computer and Information Sciences, 2009 ISCIS, 24th International Symposium ON, Piscataway, NJ Sep. 14, 2009, pp. 230-235.

* cited by examiner

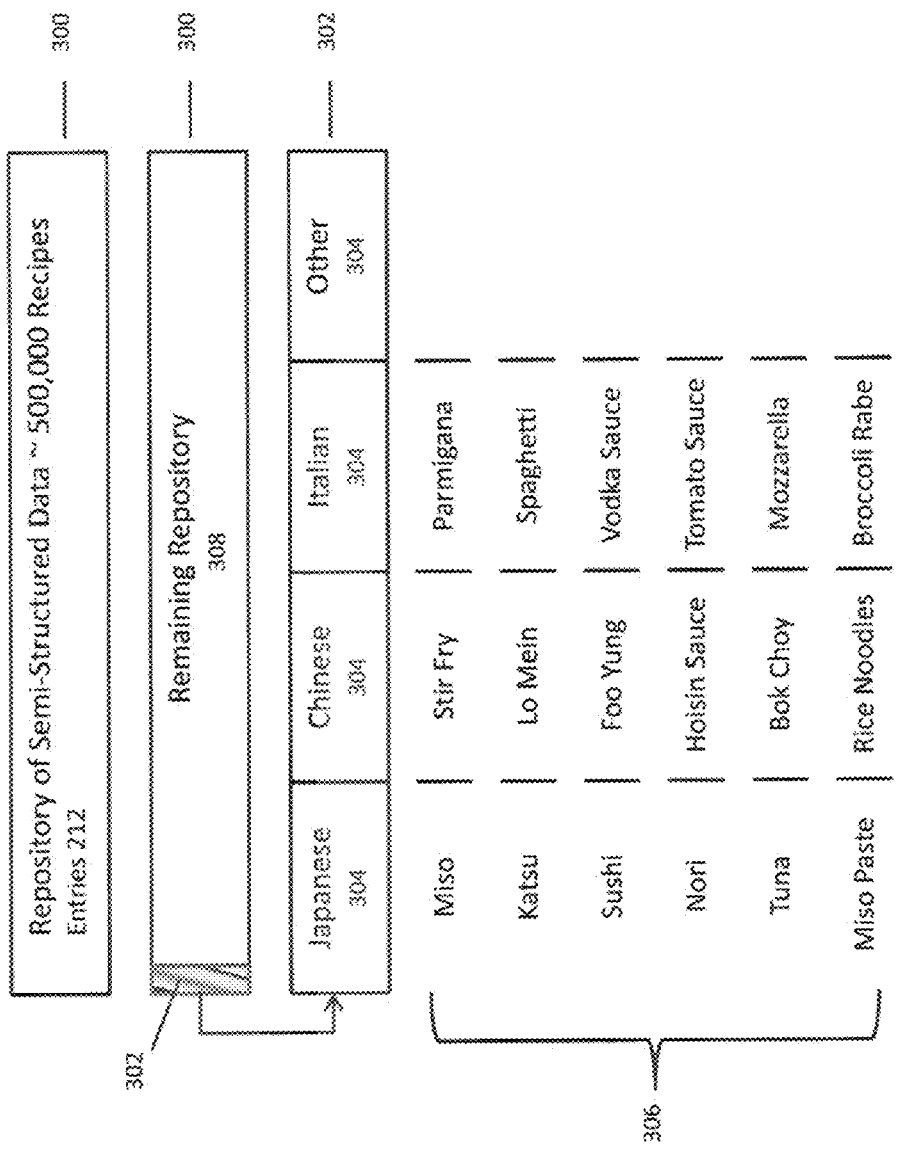

METHOD FOR ANALYZING AND CATEGORIZING SEMI-STRUCTURED DATA

FIELD OF INVENTION

The present invention relates to analyzing a set of data organized in a plurality of different formats that span well structured inputs with coordinated field assignments to raw and/or unstructured data. In particular the present invention relates to data processing of various inputs in accordance to one or more data interpretation models to categorize a full spectrum of differently structured data.

BACKGROUND

In today's modern society, data is being entered by multiple users for countless different reasons. Once the data is entered, other users want the ability to search and sort the data to interpret the data and to find relevant results quickly. However, since the data is being entered by different users, in different formats, locations and languages, there may be inconsistencies in how the data is entered. Thus, for example a search of a specific word or topic may miss relevant information because of an inconsistent entry.

An example of this is user entered recipes that are posted on a web site. The structured portion of the recipe can be fields for the name of the recipe, ingredients, cuisine, and event. However, once the users start to enter the information into the fields, there can be a large variance in how the information is actually presented. In any structured field, misspellings can be common. Also, synonyms or alternate names for recipes and ingredients are typical. For example, some users may enter a recipe as "potato soup," or "cold potato soup," while other users may enter the name "vichyssoise." However, a user searching for "vichyssoise" would likely want to see all available cold potato soup recipes.

This is true of other types of user-inputted data. Much of this data may be semi-structured or lack any structure whatsoever. The present invention can extract useful knowledge from the unstructured or semi-structured data.

SUMMARY

The teachings herein alleviate one or more of the above noted problems with consolidating and organizing data received in a variety of different formats, or in the same format but with different levels of structure, accuracy and fidelity in recording so that the data can be applied to one or more assessments. In an illustrative embodiment, a computer system allows multiple users to connect to a central server/network across a data/communication network. The server forms the gateway to a platform governed by system operative programming. Select data is collected in accordance with programmed input structures and interpreted and/or organized by one or more data structuring algorithms. The process data is then used to support various functions such as for example, search inquiries and the like.

In other examples, a computer system is networked to a plurality of users. The system has, at least, a memory storing a plurality of semi-structured user inputted data and a processor applying a data interpretative algorithm to a subset of the semi-structured user inputted data. Either the same or a second processor can use the subset of the semi-structured user inputted data to categorize the remainder of the plurality of semi-structured user inputted data. The system also has an interface allowing a user to search the categorized plurality of semi-structured user inputted data. This interface can be a web page, an application, or other portal to allow the search and retrieval of the results.

In another example of the system, the plurality of semi-structured user inputted data has data fields. Further, the plurality of semi-structured user inputted data are recipes. Then, the plurality of data fields can be at least one of a recipe title, ingredients, instructions, tags, and an image.

Regarding examples of the data interpretative algorithm, it can include a hybrid Maximum Entropy and LDA model and a term frequency-inverse document frequency and a cosine similarity analysis.

An example of a method to analyze semi-structured data include the steps of storing, in a memory, a plurality of semi-structured data entries. Each semi-structured data entry can include a plurality of data fields. A processor can sort the semi-structured data fields in each semi-structured data entry and select a subset of semi-structured data entries using a data interpretative algorithm. A topical data field can then be selected from the semi-structured data fields of the subset of the semi-structured data entries. The remaining plurality of semi-structured data entries can then be analyzed with the topical data field. A new subset of semi-structured data entries can be selected using a data interpretative algorithm on the analyzed remaining plurality of semi-structured data entries and they combined with the subset of the semi-structured data entries.

In another example, the plurality of semi-structured data entries are recipes, and the plurality of data fields comprises at least one of a recipe title, ingredients, instructions, tags, and an image. The data interpretative algorithm can include a hybrid Maximum Entropy and LDA model and a term frequency-inverse document frequency and a cosine similarity analysis.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3A is a diagram of the semi-structured data as it is analyzed by the system;

FIG. 4 is a flow chart of an example of a method of using training data to determine cuisine;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present invention provides a system and method to extract structured "knowledge" from semi-structured data. As a specific example, to sort and categorize recipes inputted by users on a website.

Figure 1:
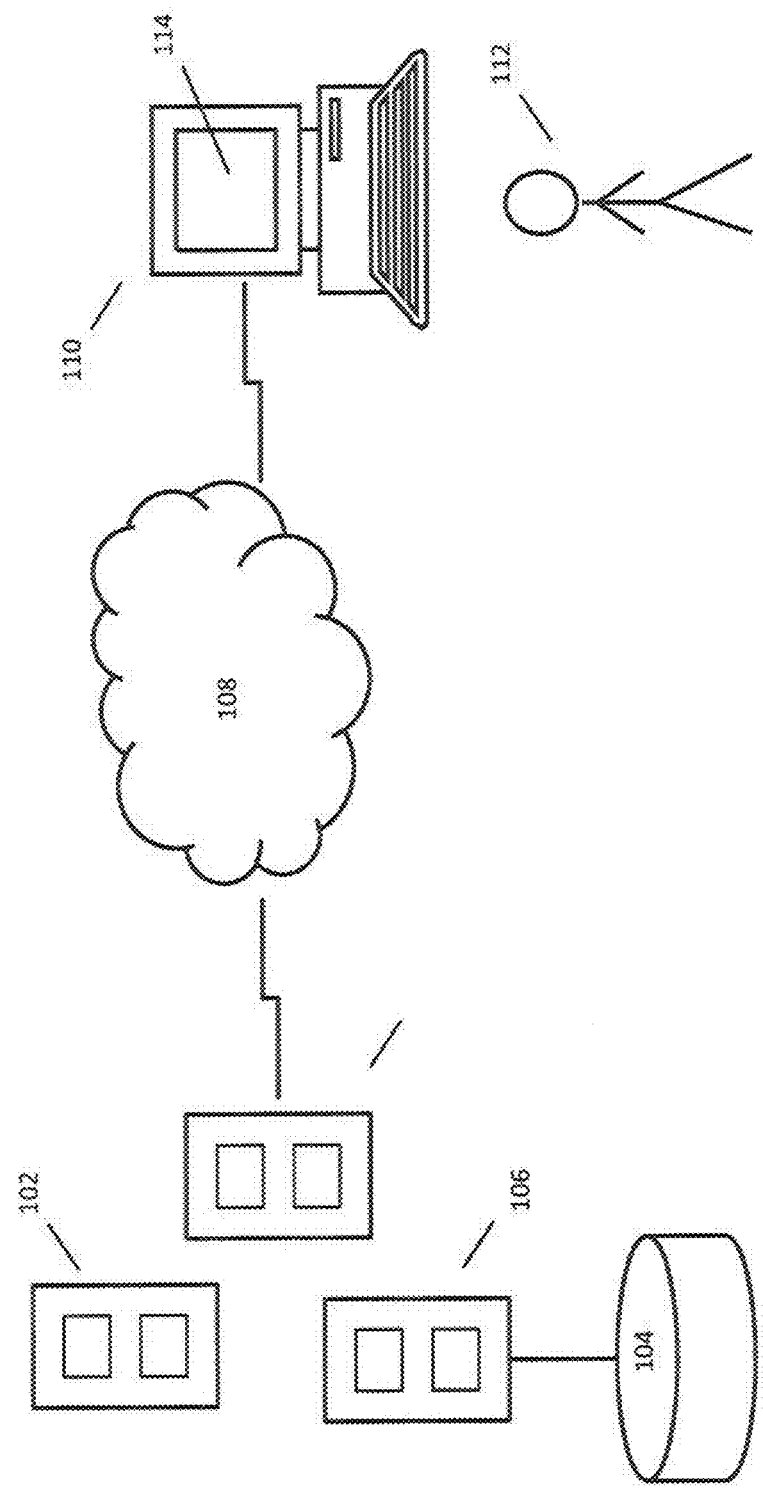
FIG. 1 is a diagram of an example of a network for implementing the present invention.

Turning to FIG. 1, the system 100 can include one or more servers 102, having storage 104 and a processor 106. The server 102 can handle all of the below processes or can be distributed among many servers as is known in the art. The server 102 can be one of many servers in a server farm or numerous servers can be distributed geographically, each performing all of the below tasks, or the tasks are divided among the plurality of servers 102. Each server 102 can have storage or memory 104 to store the programming needed to function and the data described below, or linked to central storage device. In one example, the storage 104 is non-transient memory. Further, the processor 106 can be used to perform the below tasks or particular tasks can be divided among multiple processors or multiple processors can be required to complete one task.

The servers 102 are networked 108 to one or more user devices 110. The network 108 may include one or more packet switched networks, such as an Internet protocol up) based network, a local area network (LAN), a wide area network (WAN), a personal area network (PAN), an intranet, the Internet, a cellular network (e.g., GSM (Global System for Mobile Communications), CDMA (Code-Division Multiple Access), WCDMA (Wideband CDMA), LTE (Long Term Evolution), IEEE 802.11x, etc.), a fiber-optic network, or another type of network that is capable of transmitting data. The network 108 may include a circuit-switched network, such as a public-switched telephone network (PSTN) for providing telephone services for traditional telephones.

The user device 110 can include one or more devices that communicate with Internet 108. For example, the user device 110 may include a television that includes applications (e.g., Internet Explorer®, Chrome®, etc.) and a communication interface (e.g., a wired or a wireless communication interface) to connect to Internet 108. The user device 110 can also include one or more devices that communicate with Internet 108 to provide Internet service. For example, user device 110 may include a desktop computer, a laptop computer, a palmtop computer, a netbook, tablet, smartphone, etc. or other types of communication devices. The user 112 can utilize the user device 110 to access the servers 102 over the network 108.

Figure 2A:
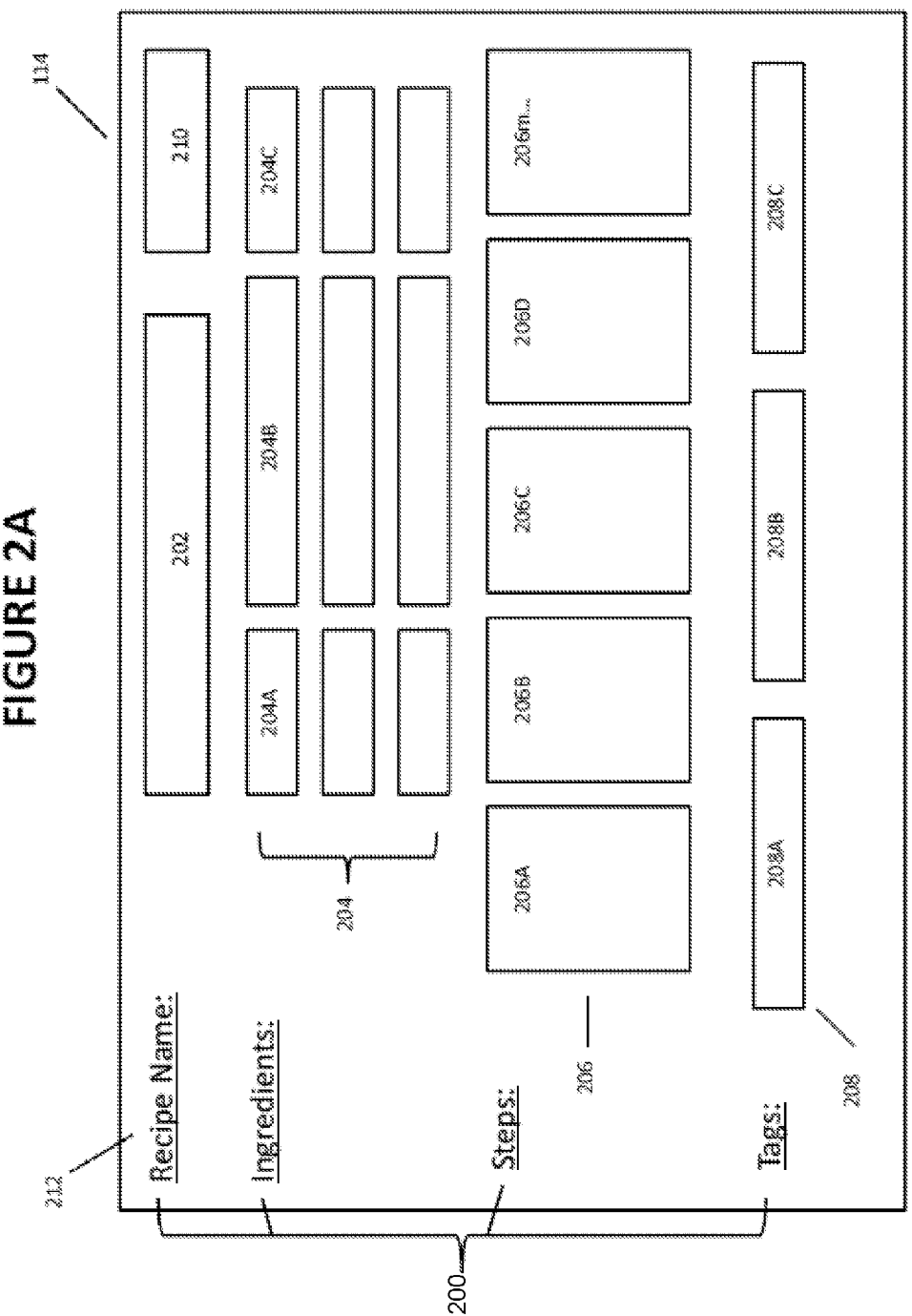
FIG. 2A is a diagram illustrating the website and semi-structured data fields.
Figure 2B:
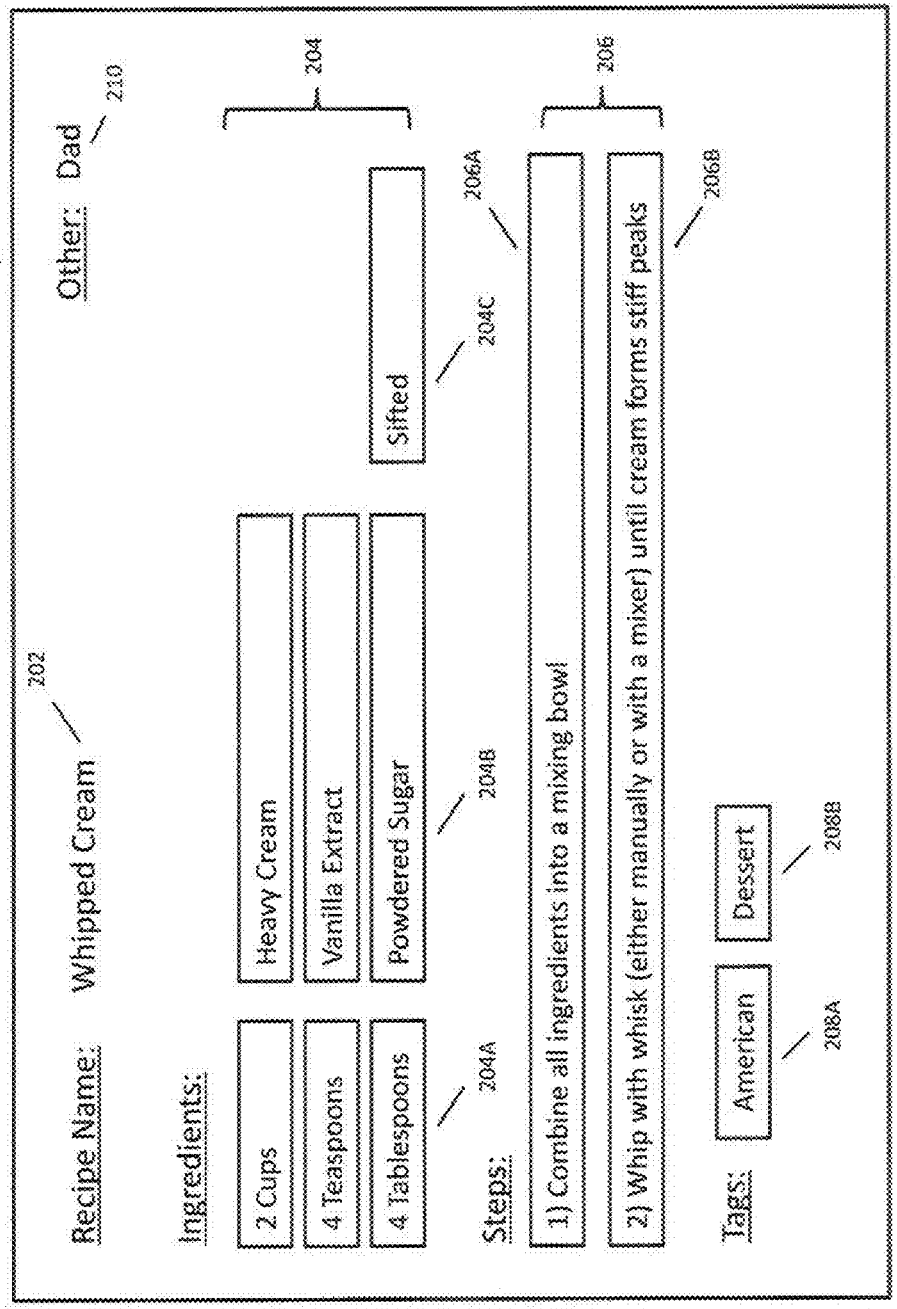
FIG. 2B illustrates an example of a semi-structured data entry.

The server 102 can host a webpage 114 that can be accessed by the user 112 using the user device 110. In FIG. 2A, the webpage 114 has the elements of the semi-structured data fields 200. In the present example, the semi-structured data fields 200 represent data fields for a user 112 to input a recipe. However, the semi-structured data fields 200 can represent any other type of semi-structured data, including hotel, restaurant, or travel destination information.

As used herein "semi-structured data" is information that can be inputted by a user without many constraints. Semi-structured data can have structure imparted from the titles of the data fields 200, and is unstructured in that a user can input any information into those fields. Examples of semi-structured data and data fields are given below. In comparison, "structured data" is data in which the user has many constraints for entry. Examples of structured data include binary or fixed choice data options, e.g., "yes/no" questions, ranking on a scale from 1 to 10, or pull-down options. "Unstructured data" has no constraints to entry; essentially the user 112 is given a blank page to enter data of any type.

For the example in FIG. 2A, the semi-structured data fields 200 can include a recipe title 202, ingredients 204, instructions or steps 206, tags 208, and an image 210. The recipe title 202 is a simple descriptor of the recipe to follow. It can include informal names like cold potato soup or pasta in meat sauce, or the formal name, for example vichyssoise or spaghetti Bolognese. The term semi-structured is applied to the recipe title 202 because the user 112 can input any words into this field, but the structure comes from the fact that what is entered is the name of the recipe.

The ingredients 204 can be semi-structured and organized and inputted differently in that there can be data fields for ingredient quantity 204A, ingredient name 204B and ingredient modifier 204C. Entries in these fields can include "2 cloves", "garlic" and "minced," or "3 cups" "flour" and "sifted," In one embodiment, all of the ingredient fields 204A, 204B, 204C are all semi-structured, allowing any number or value in the three fields. Alternately, one or more of the fields 204A, 204B, 204C can be structured, including, for example, pull-down lists for the quantities 204A or ingredients 204B. The pull-down menus can include a list of the most common data inputs, "cup," "teaspoon," "tablespoon," "stick," etc. The ingredient name 204B choices can be the simple descriptor, "flour," "sugar," and "butter" and the modifier 204C can be anything from "all-purpose," "powdered" and "unsalted" to "peeled," "chopped," or "sifted."

The steps 206 can be one field or multiple fields 206A . . . , 206n in which the use 112 can enter the instructions to prepare and cook the recipe. In the multiple field example, the instructions can be broken down into individual steps, i.e. "cream butter in mixer" or "add eggs one at a time, scraping sides of bowl after each addition." The steps 206 are less structured then the ingredient fields 204 and are typically not structured data fields. In another example, an image can be added for one or more of the steps 206 to illustrate the technique required for that step. Images can include batter consistency, shape after formation, or even trussing knots.

One or more tags 208A-208C can also be included. Tags 208 can, in some examples, represent cuisine, food type, meal, and event. Thus, a tag 208 can be for the cuisine, "Japanese," "Chinese," "Italian," or "Korean." Food type tags 208 can be "soup," "salad," "seafood," or "meat." Meal tags 208 can be "breakfast," "lunch," "dinner," "appetizer," etc. and event tags can be "holiday," "picnic," or "Thanksgiving." With the tags 208, the user 112 can add additional short identifiers that can be used to categorize the recipe. As above, some of these tags 208 can be presented as structured data, providing the user 112 with pull down menus for cuisine, like "Japanese, Chinese, Italian, Korean, French, Russian, German, Thai, Indian, German, and Mexican."

In additional examples, other data 210 can also be entered. Other data 210 can be an image of the recipe. Note, as used herein an "image" is any representation of the finished recipe or steps in the recipe. The term image can be used to identify a still image, moving images, and or an audio file. Further, the other data 210 can be a special secret shared by the user 112 to help make the recipe special or where the user 112 got the recipe, i.e. the name of the cookbook, or name of the family member who passed on the recipe.

The collection of these data fields 200 for one recipe is a semi-structured data entry 212. Semi-structured data entries 212 include the semi-structured data fields 200 noted above. In one example, the data entries 212 can be considered all of the data fields 200 entered in one particular recipe. FIG. 3A illustrates a data entry 212 using a simple recipe as an example. The data entry 212 is for whipped cream and each of the data fields 200 are linked in one entry 212 to allow a user 112 to follow the recipe.

Because the semi-structured data fields 200 are just that, semi-structured, the data input into those fields are typically not consistent. Users may misspell words, use different names for ingredients, or omit information (most commonly the tags 208). This inconsistent data entry poses problems with categorizing, searching, and returning data to other users. Examples of the present invention can analyze the semi-structured data to extract structured knowledge from data to allow for easier categorizing, searching, and renaming of the data.

In the recipe example, the structured knowledge can relate similarly named recipes so one search term can return them all. Thus, regardless if the user 112 enters "potato soup," "cold potato soup," or "vichyssoise" all of the recipes can be returned when a search for any one of those terms are entered. Further, typical dishes for a given ingredient can also be returned. For example, if a user is searching for "eggplant" the system 100 can return recipes for "baked eggplant," "mapo eggplant," "deep-fried eggplant," "eggplant parmigiana," "moussaka," and "ratatouille." With the related recipes, knowledge of dish name synonyms, important ingredients, and country cuisine can all assist in returning relevant results.

Figure 3B:
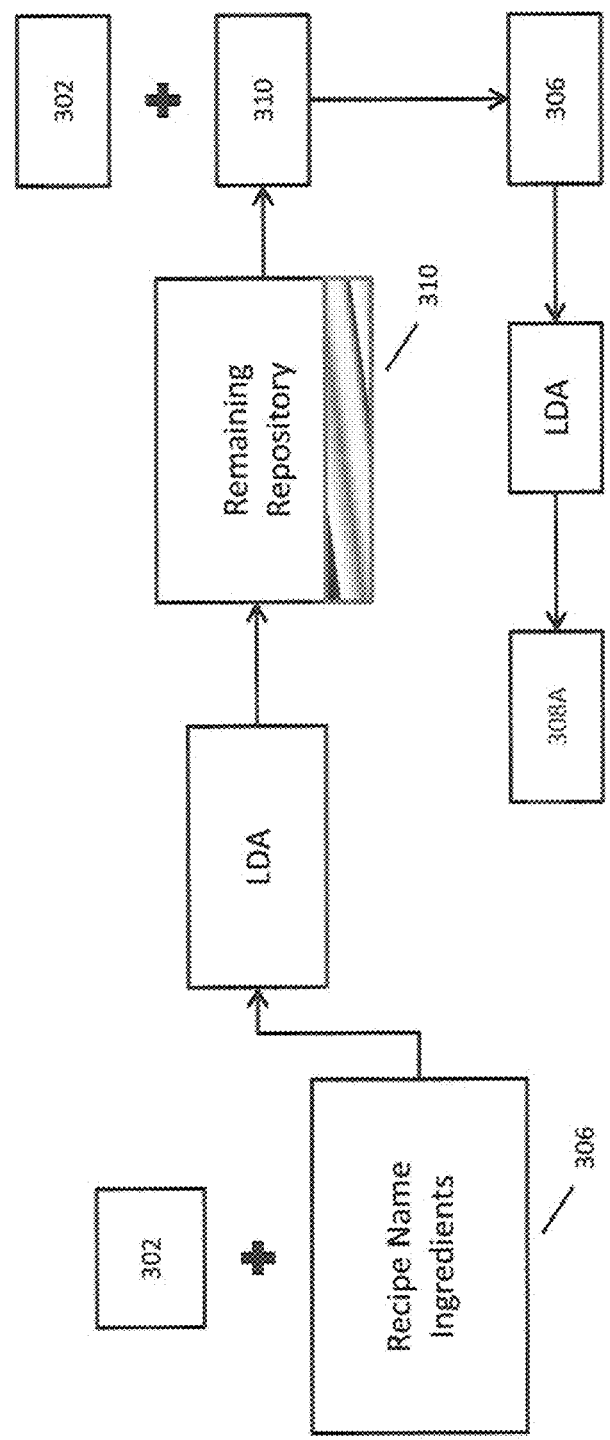
FIG. 3B is as diagram of another example of semi-structured data as it is analyzed by the system.

FIGS. 3A, 3B, and 4 illustrate an example of a method of extracting structured knowledge from semi-structured data. In continuing with the recipe example, the system 100 already has a repository 300 of semi-structured data stored in memory 104. The semi-structured data is stored as semi-structured data entries 212 (step 4001. There are numerous semi-structured data entries 212. In a recipe example, there can be 500,000 user inputted recipes. The repository of semi-structured data entries 212 can then be sorted by the semi-structured data fields 200 in each entry (step 402). For example the tag 208 can be sorted by which recipes are tagged with a country cuisine tag. A subset 302 of data entries 212 can then be selected by their topic 304 (step 404). This subset can be called the training data 302.

In the example, the topic is one or more countries identified in the country cuisine tag 208. More specifically, only 20,000 of the 500,000 recipes have a country cuisine tag 208. The tags 208 can be Japanese, Chinese, Italian, etc. Once the topic is chosen, its data field 200 becomes the topic data field 304, thus the country cuisine tag field becomes the topic data field. Accordingly, the data subset 302, or training data, can be the 20,000 recipes with country cuisine tags.

For each topic 304, one or more other semi-structured data fields 200 are selected that are related to the topic 304 and topic data field (step 406). These other semi-structured data fields 200 are only selected from the data subset 302. The selected semi-structured data fields can be the characteristics data fields 306. The information in the characteristics data fields 306 are somehow related to one or more topics in the topic data field. In the present example, both recipe names 202 and key ingredients 204 are considered characteristic of a country's cuisine. Thus, recipe names 202 containing words like "miso," "katsu," "sushi," "stir-fry," "lo mein," "foo yung," "parmigiana," "spaghetti," and "vodka sauce" can be related to the topics of Japanese, Chinese, and Italian cuisine. These are one of the characteristics 306 of this topic 304. Further, nor, tuna, miso paste, hoisin sauce, bok choy, rice noodles, tomato sauce, mozzarella, and broccoli rabe, are ingredients 204 that are characteristic of the same cuisines.

In an example, the ingredients which are the largest portion of the recipe or that are most present in the recipes are typically chosen as characteristic of the particular country's cuisine. However, some care must be taken, since rice is an ingredient that is likely just as common between Japanese and Chinese cuisine, and garlic is common between Chinese and Italian cuisine.

Once the topics 304 and characteristics 306 have been identified, an analysis of the remaining repository 308 of semi-structured data stored in memory 104 is performed (step 408). The analysis is performed to classify the remaining data entries 212 by the chosen data fields 200. The remaining repository of recipes 308 are analyzed for their particular characteristics 306 to determine what topic 304 they belong to. More simply, the recipe names and ingredients are analyzed using mathematical models to determine which country cuisine they likely belong to.

The analysis can be performed using a hybrid of a Maximum Entropy Classifier and a Latent Dirichlet Allocation model (hereinafter "LDA"). Both are mathematical techniques that are used in natural language processing and machine learning. The theory of Maximum Entropy is based in Bayesian statistics. The technique requires a testable subset of data to estimate the probability that certain terms occur within the context of a document. LDA is also a statistical model to determine similarities in data. LDA characterizes each document (or recipe in the present example) by a particular topic (in the example, the cuisine). As a generic example, a document can be determined to have a "dog" topic if it contains words like "puppy" or "bark." in the example, a recipe can be determined to be "Italian" if its name contains the word "parmigiana" and it uses tomatoes as a key ingredient.

The LDA component can describe each data entry (recipe) with a vector of topic probabilities. This vector can be considered the recipe's "score," This method is simpler than using a "Bag of Words" model, since there are fewer dimensions to analyze. A Bag of Words model looks mainly at the frequency of words within to document. This is difficult to employ with a recipe, where almost all words are used sparsely and usually have a common repetition count.

The LDA model is computing an LDA centroid (step 408) for each cuisine. The LDA centroid, in an example, is a sum over topics from all recipes from a given country to compute a "centroid vector" for a given cuisine. The initial training data 302 or updated training data 310 (see FIG. 3B) can be selected based on a cosine similarity to a cuisine centroid (step 410). The updated training data 310 is then combined with the previous training data 302 (step 412). The above process of determining a topic and characteristics (step 406) is repeated and then the remaining repository 308a is again analyzed. In one example, the updated training data 310 are selected because they are the top 10% of the recipes (data entries) that have their cuisine correctly determined. This process permits the centroid vector to change once the updated training data 310 is analyzed. As the process repeats, recipe names can be extracted based on the initial country tagged recipes in the training data, from the training data updates, and recipes classified with high confidence by the Maximum Entropy classifier.

The above hybrid Maximum Entropy and LDA model is relatively simplified since the characteristics are "binary", that is the dish name or ingredient name is present in the recipe or not present in the first instance. This simplifies the above noted scoring. As an example, a recipe's score based on recipe name and cuisine can be:

$$z - \text{score}(\text{dish, cuisine}) = \frac{f(\text{dish, cuisine}) - \text{expected}}{st.dev} = \qquad \text{Eq. 1}$$

$$\frac{(f(\text{dish, cuisine}) - p(\text{dish, all\_cuisine}) * f(\text{all\_dish\_cuisine}))}{\sqrt{f(\text{all\_dish, all\_cuisine}) * p(\text{dish, all\_cuisine}) * (1 - p(\text{dish, all\_cuisine}))}}$$

where the "z-score" is the standard score, the function f is used to compute a raw score of the recipe, p is the probability.

The repeated iterations yielded promising results when the cuisines Chinese, Italian and Korean were run. The results are:

| Iterations | P | R |
| --- | --- | --- |
| Iteration 0 | 91.67% | 70.21% |
| Iteration 1 | 92.50% | 78.72% |
| Iteration 2 | 92.85% | 82.98% | where "P" is the precision and "R" is the recall or correlation. Results when the scores were tested on all non-generic cuisines:

| Iterations | P | R |
| --- | --- | --- |
| Iteration 0 | 63.51% | 40.87% |
| Iteration 1 | 68.29% | 48.69% |
| Iteration 2 | 67.40% | 50.43% |

An example of a sample dish name evaluation was performed on a ~400,000 entry recipe database. The results were surprising. Recipes with a z-score greater than 1 were analyzed after each iteration to determine if the cuisine was correct:

| | Correct | Maybe | Incorrect | Total | % correct |
| --- | --- | --- | --- | --- | --- |
| Chinese0 | 73 | 4 | 8 | 82 | 85.88% |
| Chinese1 | 96 | 12 | 9 | 117 | 82.05% |
| Chinese2 | 98 | 11 | 11 | 120 | 81.67% |
| Italian0 | 46 | 5 | 2 | 53 | 86.79% |
| Italian1 | 81 | 16 | 13 | 110 | 73.64% |
| Italian2 | 82 | 16 | 12 | 110 | 74.55% |
| Korean0 | 30 | 0 | 0 | 30 | 100.00% |
| Korean1 | 43 | 2 | 0 | 45 | 95.56% |
| Korean2 | 45 | 2 | 0 | 47 | 95.74% |

The advantage of using the recipe names 202 is that an operator can make an easy and quick evaluation and there is no need to check recipe by recipe. Further, the analysis can be used in active learning fashion, i.e. the recipe name human evaluation results can be used for training data updates.

Figure 5:
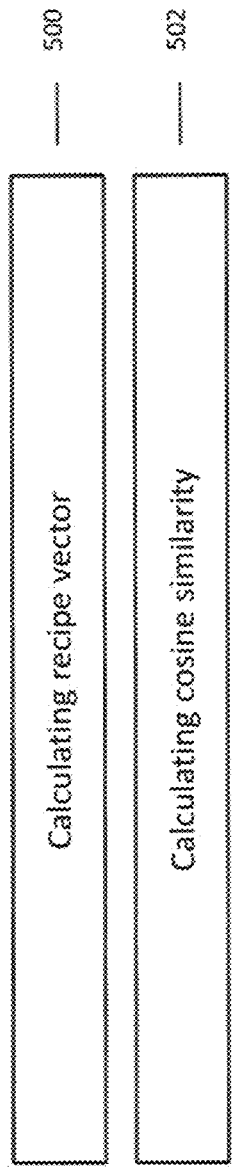
FIG. 5 is a flow chart of an example of a method to determine recipe similarity.

Another example, illustrated in FIG. 5, analyzes the repository 300 to determine which recipes are similar to each other. One level of analysis is to match recipe names 202. Another is to check similarity based on ingredients 204. Another vector for the recipes can be calculated using a method known as "term frequency-inverse document frequency" (herein "TF-IDF") (step 500). TF-IDF is a numerical statistic which reflects how important a word is to a document in a collection. Better stated to the example, how important an ingredient is to a recipe in the repository. The "term" in this context is the ingredient and the "document frequency" is the number of recipe types that the ingredient appears in. Once the vectors are calculated for every recipe in the repository 300 a cosine similarity can be run (step 502). A cosine similarity measures how similar two vectors are. The more similar the vectors are to each other, the more similar the recipes can be to each other.

Figure 6:
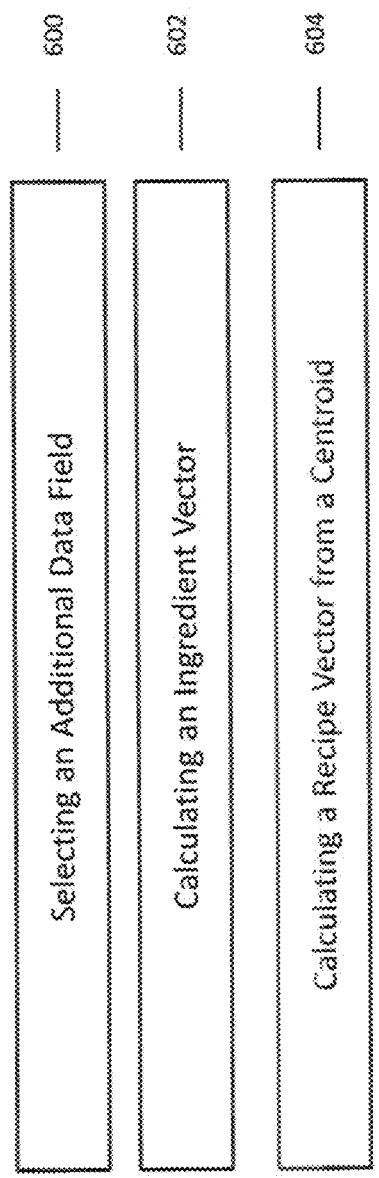
FIG. 6 is a flow chart of another example of a method to determine recipe similarity.

FIG. 6 illustrates a further example than can determine recipe similarity with additional accuracy. In addition to using the ingredient data field 204, another dimension or variable can be used, in context with the above example, another data field 200 can be used. For example, the cuisine data field 208, other tag information 208 or steps/preparation method 206 can be included in the analysis. The vectors or scores for recipes (data entries 212) in the repository 300 can now be calculated by mapping ingredients to concepts or from recipe to ingredients to concepts and compare their similarity. Thus, instead of representing each recipe/dish type as a vector of ingredients, and comparing the recipe similarity using those vectors, first, each ingredient can be represented as a TF-IDF valued vector of recipe categories. Another data field 204, other than recipe name 202 and ingredient 204, can be selected from. Then a vector for each recipe name can be computed as a centroid (or simply average) of its ingredient vectors.

This method is comparable to Explicit Semantic Analysis ("ESA"). ESA is a form of natural language processing and information retrieval that is a vectorial representation of text (individual words or entire documents). Specifically, in ESA, a word is represented as a column vector in a TF-IDF matrix of text and a document (string of words) is represented as the centroid of the vectors representing its words.

In the method, the user selects an additional data field 204 (step 600) to include with the recipe name 202 and ingredient 204 fields. Next, calculate a TF-IDF valued vector for each ingredient based on the fields (step 602). With the ingredient vectors, calculate a recipe name vector as a centroid of the ingredient vectors (step 604).

Optionally a Lagrangian kernel can be applied to the recipe-category matrix that can now take into account category-to-category similarity and smooth out the scores. The Lagrangian mechanics can summarize the dynamics of the recipes and categories.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

I claim:

1. A computer system presenting a semi-structured topic and semi-structured or structured characteristics to a plurality of users over a network, comprising:
    a memory storing a plurality of semi-structured data entries, each data entry including a plurality of data fields, the data entries including:
        at least one data entry having a predetermined topic, the predetermined topic associated with characteristics; and
        at least one remaining data entry not having a predetermined topic; and
    a processor selecting one or more semi-structured data entries sharing a same predetermined topic to form a subset, selecting, from the subset, one or more semi-structured data fields related to characteristics of the same predetermined topic, and applying a data interpretative algorithm to each of the at least one remaining data entry based on the selected one or more data fields to determine its topic,
    wherein the topic corresponds to a cuisine, and the characteristics correspond to recipe names and ingredients,
    wherein the data interpretative algorithm comprises at least one of a hybrid Maximum Entropy and Latent Dirichlet Allocation (LDA) model, and a term frequency-inverse document frequency and a cosine similarity analysis.

2. The system of claim 1, wherein the selected subset of semi-structured data entries are training data, and
    wherein the processor combines previous training data and updated training data, determines a topic and characteristic, and repeatedly applies the data interpretative algorithm.

3. A method of presenting a semi-structured topic and semi-structured or structured characteristics to a plurality of users over a network, the steps comprising:
    storing, in a memory, a plurality of semi-structured data entries, each data entry including a plurality of data fields, the data entries including:
        at least one data entry having a predetermined topic, the predetermined topic associated with characteristics; and
        at least one remaining data entry not having a predetermined topic;
    selecting, using a processor, one or more semi-structured data entries sharing a same predetermined topic to form a subset;
    selecting, using the processor, from the subset, one or more semi-structured data fields related to characteristics of the same predetermined topic; and
    applying, using the processor, a data interpretative algorithm to each of the at least one remaining data entry based on the selected one or more data fields to determine its topic,
    wherein the topic corresponds to a cuisine, and the characteristics correspond to recipe names and ingredients,
    wherein the data interpretative algorithm comprises at least one of a hybrid Maximum Entropy and LDA model, and a term frequency-inverse document frequency and a cosine similarity analysis.

4. The method of claim 3, wherein the selected subset of semi-structured data entries are training data, and further comprising the steps of:
    combining previous training data and updated training data;
    determining a topic and characteristic, and
    repeatedly applying the data interpretative algorithm.

* * * * *